Patented June 12, 1951

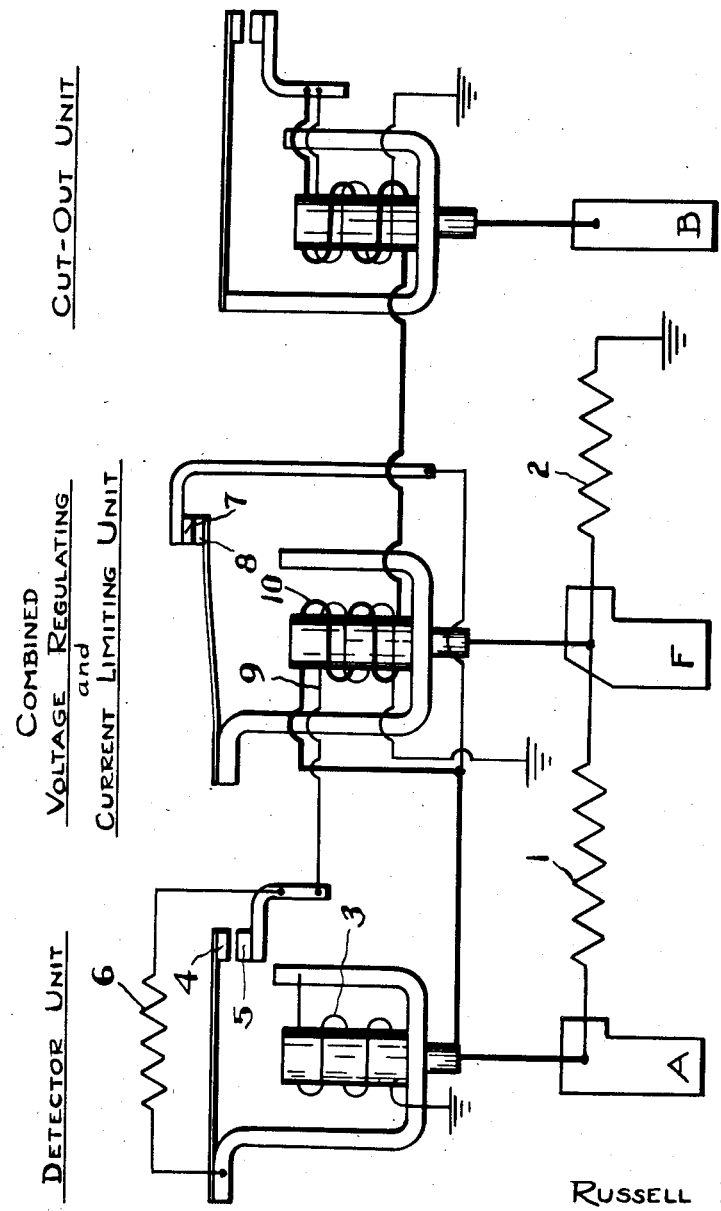

2,556,371

UNITED STATES PATENT OFFICE 2,556,371

VOLTAGE REGULATOR

Russell B. Hussey, Springfield, Mass., assignor to American Bosch Corporation, Springfield, Mass., a corporation of New York Application November 9, 1946, Serial No. 709,031

3 Claims. (Cl. 322—25)

This invention relates to regulating systems for electric generators and more particularly to such a system for automatically regulating the output of variable speed generators such as used on automotive vehicles and comprises a series regulating system of the type employing a vibrator type regulator embodying a cut-out relay, current limiter and voltage regulator relay and a voltage detection relay and wherein the cut-out relay connects the generator to the battery or load circuit when the output of the unit reaches a predetermined amount and disconnects the unit when the output drops below said amount and the current limiter functions when a predetermined maximum generator output has been reached, which controls the field excitation in the generator and, therefore, the maximum permissible output of the unit can never be exceeded no matter how large the external load may be, and the detection relay operates when the line voltage reaches a predetermined value and causes the voltage regulator to operate, and the voltage regulator starts to vibrate when the line voltage reaches said predetermined value under the control of said detection relay, cutting in and out a series field resistance, thereby controlling the field excitation and stabilizing the generator voltage.

The principal object of the present invention is to provide a new and improved regulating system of the type set forth wherein the voltage regulator unit and the current limiter unit have been combined into a single unit, thus providing a relatively compact and economical construction wherein burning, pitting or wear of the contacts of this combined unit do not affect the voltage output of the regulator.

Another object of the invention is to provide a regulating system of the type set forth wherein the function of the prior four unit regulator is accomplished by a three unit regulating system, thus providing a much more compact and economical construction.

Another object of the invention is to provide a regulating system having fewer units than the prior four unit type regulator and yet having greater stability and longer contact point life than prior three unit type regulators and also wherein more economical contact material can be used.

Other objects and advantages of the invention will be apparent from the following description taken in connection with the accompanying drawing. It will be understood that many details of construction and arrangement of parts may be made without departing from the spirit of the invention as expressed in the accompanying claims. I, therefore, do not wish to be limited to the exact details of construction and arrangement of parts shown and described, as the preferred form has been given by way of illustration only.

Referring to the drawing the single figure is a diagrammatic view of a regulating system embodying the invention.

Referring more particularly to the drawing, the device shown embodying the present invention, which is adapted for regulating the output of variable speed generators such as used on automotive vehicles, comprises the detector unit, combined voltage regulating and current limiting unit and cut-out unit as designed. The terminals designated by the letters A, F and B are the armature, field and battery terminals respectively. The terminal A being adapted to be connected to the armature circuit of the generator and the terminal F to the field circuit of the generator and the terminal B is adaped to be connected to the usual storage battery.

The cut-out unit is of conventional type as are the resistances 1 and 2.

The detector unit has the normal voltage coil winding 3 for six, twelve, twenty-four or more volts as desired and this unit has the contacts 4 and 5 which are normally open and across which is connected the resistance 6.

The combined voltage regulating and current limiting unit has the contacts 7 and 8 which are normally closed. This unit has the coil 9 which is similar to the coil 3 in the detector unit and the resistor 6 of the detector unit is adapted to produce an energy level in this coil 9 and maintain said energy at a level nearly that required to operate the voltage regulating and current limiting unit so that when this unit goes onto current limiting, the series winding 10 increases the energy of the unit to an extent where the unit functions as a current limiter.

As previously pointed out, the contacts 4 and 5 of the detector unit are normally open whereas with prior types such contacts are normally closed and when the contacts 4 and 5 close, the resistor 6 is shortcircuited and the unit furnishes the coil 9 with full power which opens contacts 7 and 8, thereby inserting the regulating resistance 1 in the field circuit of the generator in the normal manner.

The combined voltage regulating and current limiting unit is formed by winding the shunt coil 9 and a current limiting coil 10 on the same core in superimposed relation and connecting them according to the wiring diagram shown in the drawing.

The action of the shunt or voltage regulating coil 9 and its affixed armature is entirely dependent upon the detector unit which combination regulates the voltage up to current limitation. At current limitation, voltage regulation ceases and the current limiting coil assumes control of the unit and this function proceeds in the normal manner. Due to the fact that the voltage regulating and current limiting unit is relatively insensitive, burning, pitting or wear of the contacts of the combined unit do not affect the voltage output of the regulator as such contacts are not set for any special voltage output but are merely set for current limiting, that is, the condition of the points of the combined voltage regulating and current limiting unit does not affect the operation of the detector unit which is the control unit and also that as there is practically no wear on the contacts 4 and 5 of the detector unit, the said contacts last much longer, that is, practically for an indefinite period, as such contacts are not breaking heavy field currents.

In the case of a regulator for use in a six volt system, the coils 3 and 9 could be of the conventional type and winding normal for such system, the resistance 1 could be of 21 ohms, the resistance 2 of 14 ohms and the resistor 6 of 40 ohms. In such case the coils 3 and 9 could be of 12 ohms. This example has, however, been given merely by way of illustration and it will be readily recognized by those skilled in the art that components of other electrical values could be satisfactorily employed.

It is pointed out that by eliminating the cutout unit, the regulator is adaptable for systems without batteries.

From the foregoing it will be seen that I have provided simple, efficient and economical means for obtaining all of the objects and advantages of the invention.

Having described my invention, I claim:

1. In a vibrator type voltage regulator for automatically regulating the output of an automotive type variable speed generator and adapted to be connected to such generator, a detector relay unit including a pair of contacts, said unit being responsive to generator voltage, a combined voltage regulating and current limiting relay unit including a single core and armature and a voltage regulating coil and a current limiting coil, said voltage regulating coil being in series with the contacts of said detector unit and said current limiting coil being in series with the output circuit of said generator, and a resistance across the contacts of said detector unit when said contacts are open and adapted to be shortcircuited when said contacts are closed, said resistance being adapted to be energized by the generator for maintaining an energy level in said voltage regulating coil which is less than the amount required to operate said unit.

2. A vibrator type voltage regulator for automatically regulating the output of an automotive type variable speed generator and adapted to be connected to said generator, having a detector relay unit responsive to generator voltage and a combined voltage regulating and current limiting relay unit connected to said detector unit and responsive to both detector relay and generator current, said combined unit including a single core and armature and a pair of coils and a pair of cooperating contacts, said detector relay unit and said combined relay unit being connected so that said detector unit will control the operation of said combined unit for voltage control, said detector unit comprising a coil, a pair of contacts and a resistor across said contacts being adapted to be energized by the generator for normally maintaining energy in said combined unit at a level below that required to operate said unit.

3. A vibrator type voltage regulator for automatically regulating the output of an automotive type variable speed generator and adapted to be connected to said generator, having a detector relay unit responsive to generator voltage and a combined voltage regulating and current limiting relay unit connected to said detector unit and responsive to both detector relay and generator current, said combined unit including a single core and armature and a pair of coils and a pair of cooperating contacts, said detector relay unit and said combined relay unit being connected so that said detector unit will control the operation of said combined unit for voltage control, said detector unit comprising a coil, a pair of contacts and a resistor across said contacts, said resistor being adapted to be energized by the generator for normally maintaining energy in the coil of said combined unit at a level slightly below that required to operate said unit.

RUSSELL B. HUSSEY.

REFERENCES CITED

The following references are of record in the file of this patent:

UNITED STATES PATENTS

| Number | Name | Date |
| --- | --- | --- |
| Re. 18,516 | Beetem | July 12, 1932 |
| 1,246,854 | Bliss | Nov. 20, 1917 |
| 1,354,798 | Bliss | Oct. 5, 1920 |
| 1,724,197 | Hartzell | Aug. 13, 1929 |
| 2,046,699 | Rady | July 7, 1936 |
| 2,358,482 | Thompson | Sept. 19, 1944 |